(12) United States Patent
Lydon et al.

(10) Patent No.: US 8,112,567 B2
(45) Date of Patent: Feb. 7, 2012

(54) METHOD AND SYSTEM FOR CONTROLLING POWER PROVIDED TO AN ACCESSORY

(75) Inventors: Gregory T. Lydon, Santa Cruz, CA (US); Scott Krueger, San Francisco, CA (US); Donald J. Novotney, San Jose, CA (US); John B. Filson, San Jose, CA (US); David Tupman, San Francisco, CA (US)

(73) Assignee: Apple, Inc., Cupertino, CA (US)

( * ) Notice: Subject to any disclaimer, the term of this patent is extended or adjusted under 35 U.S.C. 154(b) by 183 days.

(21) Appl. No.: 12/478,235

(22) Filed: Jun. 4, 2009

(65) Prior Publication Data
US 2009/0249101 A1 Oct. 1, 2009

Related U.S. Application Data

(63) Continuation of application No. 11/519,278, filed on Sep. 11, 2006, now Pat. No. 7,558,894.

(51) Int. Cl.
*G06F 13/42* (2006.01)
(52) U.S. Cl. ............... 710/105; 710/110; 710/305
(58) Field of Classification Search .......... 710/104–105, 710/110, 62–64, 72–74, 8–12, 300–315
See application file for complete search history.

(56) References Cited

U.S. PATENT DOCUMENTS

| | | | |
|---|---|---|---|
| 4,673,861 A | 6/1987 | Dubovsky et al. |
| 4,850,899 A | 7/1989 | Maynard |
| 4,916,334 A | 4/1990 | Minagawa et al. |
| 4,924,216 A | 5/1990 | Leung |
| 4,938,483 A | 7/1990 | Yavetz |
| 5,041,025 A | 8/1991 | Haitmanek |
| 5,051,606 A | 9/1991 | Ikehara |
| 5,055,069 A | 10/1991 | Townsend et al. |
| 5,080,603 A | 1/1992 | Mouissie |
| 5,104,243 A | 4/1992 | Harding |
| 5,108,313 A | 4/1992 | Adams |
| 5,150,031 A | 9/1992 | James et al. |
| 5,186,646 A | 2/1993 | Pederson |

(Continued)

FOREIGN PATENT DOCUMENTS
EP 1104150 A2 5/2001
(Continued)

OTHER PUBLICATIONS

Altec Lansing, "inMOTION Users Guide," Corp. Headquarters, 535 Rte.6 & 209, Milford, PA 18337.

(Continued)

*Primary Examiner* — Raymond Phan
(74) *Attorney, Agent, or Firm* — Kilpatrick Townsend & Stockton LLP (57) ABSTRACT

A method for a portable media player to control power provided an accessory is disclosed. The method includes requesting information about the power capabilities of the accessory by the portable media player. The method further includes providing information about the power capabilities of the accessory by the accessory to the portable media player, and utilizing the information to set the power of the accessory. A method and system in accordance with the present invention provides a system that allows a portable media player to obtain information from an accessory concerning its power requirements. A portable media player can then utilize the power requirements information to allow for the powering of the accessory when connected to the portable media player.

24 Claims, 8 Drawing Sheets

U.S. PATENT DOCUMENTS

| | | |
|---|---|---|
| 5,247,138 A | 9/1993 | Landmeier |
| 5,277,624 A | 1/1994 | Champion |
| 5,471,128 A | 11/1995 | Patino et al. |
| 5,525,981 A | 6/1996 | Abernethy |
| 5,586,893 A | 12/1996 | Mosquera |
| 5,592,588 A | 1/1997 | Reekes et al. |
| 5,618,045 A | 4/1997 | Kagan et al. |
| 5,648,712 A | 7/1997 | Hahn |
| 5,660,558 A | 8/1997 | Osanai et al. |
| 5,675,467 A | 10/1997 | Nishimura et al. |
| 5,727,866 A | 3/1998 | Kraines et al. |
| 5,732,361 A | 3/1998 | Liu |
| 5,754,027 A | 5/1998 | Oglesbee et al. |
| 5,830,001 A | 11/1998 | Kinoshita |
| 5,835,862 A | 11/1998 | Nykanen et al. |
| 5,845,217 A | 12/1998 | Lindell et al. |
| 5,859,522 A | 1/1999 | Theobald |
| 5,884,323 A | 3/1999 | Hawkins et al. |
| 5,901,049 A | 5/1999 | Schmidt et al. |
| 5,964,847 A | 10/1999 | Booth, III et al. |
| 5,975,957 A | 11/1999 | Noda et al. |
| 5,991,640 A | 11/1999 | Lilja et al. |
| 6,007,372 A | 12/1999 | Wood |
| 6,012,105 A | 1/2000 | Rubbmark et al. |
| 6,031,797 A | 2/2000 | Van Ryzint et al. |
| 6,053,773 A | 4/2000 | Wu |
| 6,078,402 A | 6/2000 | Fischer et al. |
| 6,078,789 A | 6/2000 | Bodenmann et al. |
| 6,125,455 A | 9/2000 | Yeo |
| 6,130,518 A | 10/2000 | Gabehart et al. |
| 6,139,373 A | 10/2000 | Ward et al. |
| 6,154,773 A | 11/2000 | Roberts et al. |
| 6,154,798 A | 11/2000 | Lin et al. |
| 6,161,027 A | 12/2000 | Poirel |
| 6,169,387 B1 | 1/2001 | Kaib |
| 6,175,358 B1 | 1/2001 | Scott-Jackson et al. |
| 6,178,514 B1 | 1/2001 | Wood |
| 6,184,652 B1 | 2/2001 | Yang |
| 6,184,655 B1 | 2/2001 | Malackowski |
| 6,188,265 B1 | 2/2001 | Liu et al. |
| 6,192,340 B1 | 2/2001 | Abecassis |
| 6,203,345 B1 | 3/2001 | Roque et al. |
| 6,204,637 B1 | 3/2001 | Rengan |
| 6,206,480 B1 | 3/2001 | Thompson |
| 6,211,581 B1 | 4/2001 | Farrant |
| 6,211,649 B1 | 4/2001 | Matsuda |
| 6,224,420 B1 | 5/2001 | Nishio et al. |
| 6,230,205 B1 | 5/2001 | Garrity et al. |
| 6,230,322 B1 | 5/2001 | Saib et al. |
| 6,234,827 B1 | 5/2001 | Nishio et al. |
| 6,236,395 B1 | 5/2001 | Sezan et al. |
| 6,247,135 B1 | 6/2001 | Feague |
| 6,252,380 B1 | 6/2001 | Koenck |
| 6,255,961 B1 | 7/2001 | Van Ryzin et al. |
| 6,261,109 B1 | 7/2001 | Liu et al. |
| 6,262,723 B1 | 7/2001 | Matsuawa et al. |
| 6,267,623 B1 | 7/2001 | Hisamatsu |
| 6,268,845 B1 | 7/2001 | Pariza et al. |
| 6,271,605 B1 | 8/2001 | Carkner et al. |
| 6,272,328 B1 | 8/2001 | Nguyen et al. |
| 6,280,251 B1 | 8/2001 | Nishio et al. |
| 6,283,789 B1 | 9/2001 | Tsai |
| 6,304,764 B1 | 10/2001 | Pan |
| 6,314,326 B1 | 11/2001 | Fuchu |
| 6,314,479 B1 | 11/2001 | Frederick et al. |
| 6,316,916 B2 | 11/2001 | Bohne |
| 6,319,061 B1 | 11/2001 | Chen et al. |
| 6,322,396 B1 | 11/2001 | Kuan |
| 6,336,365 B1 | 1/2002 | Blackadar et al. |
| 6,344,727 B1 | 2/2002 | Desai et al. |
| 6,353,894 B1 | 3/2002 | Pione |
| 6,354,713 B1 | 3/2002 | Leifer et al. |
| 6,358,089 B1 | 3/2002 | Kuroda et al. |
| 6,372,974 B1 | 4/2002 | Gross et al. |
| 6,377,825 B1 | 4/2002 | Kennedy et al. |
| 6,385,596 B1 | 5/2002 | Wiser et al. |
| 6,394,905 B1 | 5/2002 | Takeda et al. |
| 6,418,421 B1 | 7/2002 | Hurtado et al. |
| 6,429,622 B1 | 8/2002 | Svensson |
| 6,429,879 B1 | 8/2002 | Sturgeon et al. |
| 6,431,915 B1 | 8/2002 | Ko |
| 6,453,371 B1 | 9/2002 | Hampson et al. |
| 6,454,592 B2 | 9/2002 | Takagi |
| 6,461,173 B1 | 10/2002 | Mizuno et al. |
| 6,464,542 B1 | 10/2002 | Lee |
| 6,468,110 B2 | 10/2002 | Fujino et al. |
| 6,476,825 B1 | 11/2002 | Croy et al. |
| 6,478,603 B1 | 11/2002 | Wu |
| 6,483,428 B1 | 11/2002 | Fish et al. |
| 6,485,328 B1 | 11/2002 | Wu |
| 6,489,751 B2 | 12/2002 | Small et al. |
| 6,501,441 B1 | 12/2002 | Ludtke et al. |
| 6,505,160 B1 | 1/2003 | Levy et al. |
| 6,524,119 B2 | 2/2003 | Kato et al. |
| 6,526,287 B1 | 2/2003 | Lee |
| 6,535,981 B1 | 3/2003 | Shimizu |
| 6,535,983 B1 | 3/2003 | McCormack et al. |
| 6,558,201 B1 | 5/2003 | Begley et al. |
| 6,559,773 B1 | 5/2003 | Berry |
| 6,577,877 B1 | 6/2003 | Charlier et al. |
| 6,589,076 B1 | 7/2003 | Davis et al. |
| 6,591,085 B1 | 7/2003 | Grady |
| 6,608,264 B1 | 8/2003 | Fouladpour |
| 6,608,399 B2 | 8/2003 | McConnell et al. |
| 6,614,232 B1 | 9/2003 | Mukai |
| 6,616,473 B2 | 9/2003 | Kamata et al. |
| 6,629,197 B1 | 9/2003 | Bhogal et al. |
| 6,642,629 B2 | 11/2003 | DeLeeuw |
| 6,643,777 B1 | 11/2003 | Chu |
| 6,651,138 B2 | 11/2003 | Lai et al. |
| 6,653,813 B2 | 11/2003 | Khatri |
| 6,663,420 B1 | 12/2003 | Xiao |
| 6,665,803 B2 | 12/2003 | Lunsford et al. |
| 6,670,997 B1 | 12/2003 | Northrup |
| 6,674,995 B1 | 1/2004 | Meyers et al. |
| 6,687,454 B1 | 2/2004 | Kuroiwa |
| 6,697,944 B1 | 2/2004 | Jones et al. |
| 6,708,283 B1 | 3/2004 | Nelvin et al. |
| 6,724,339 B2 | 4/2004 | Conway et al. |
| 6,725,061 B1 | 4/2004 | Hutchison, IV et al. |
| 6,728,546 B1 | 4/2004 | Peterson et al. |
| 6,728,729 B1 | 4/2004 | Jawa et al. |
| 6,747,859 B2 | 6/2004 | Walbeck et al. |
| 6,754,468 B1 | 6/2004 | Sieben et al. |
| 6,761,635 B2 | 7/2004 | Hoshino et al. |
| 6,774,939 B1 | 8/2004 | Peng |
| 6,776,626 B2 | 8/2004 | Huang et al. |
| 6,776,660 B1 | 8/2004 | Kubota et al. |
| 6,776,665 B2 | 8/2004 | Huang |
| 6,799,226 B1 | 9/2004 | Robbin et al. |
| 6,801,964 B1 | 10/2004 | Mahdavi |
| 6,813,528 B1 | 11/2004 | Yang |
| 6,816,376 B2 | 11/2004 | Bright et al. |
| 6,830,160 B2 | 12/2004 | Risolia |
| 6,859,538 B2 | 2/2005 | Voltz |
| 6,859,854 B2 | 2/2005 | Kwong |
| 6,879,843 B1 | 4/2005 | Kim |
| 6,928,295 B2 | 8/2005 | Olson et al. |
| 6,931,266 B2 | 8/2005 | Miyoshi et al. |
| 6,931,456 B2 | 8/2005 | Payne et al. |
| 6,939,177 B2 | 9/2005 | Kato et al. |
| 6,944,704 B2 | 9/2005 | Brelin |
| 6,991,483 B1 | 1/2006 | Milan et al. |
| 7,004,787 B2 | 2/2006 | Milan |
| 7,006,793 B2 | 2/2006 | Himmel et al. |
| 7,013,164 B2 | 3/2006 | Lin |
| 7,040,919 B2 | 5/2006 | Yao |
| 7,046,230 B2 | 5/2006 | Zadesky |
| 7,050,783 B2 | 5/2006 | Curtiss et al. |
| 7,054,888 B2 | 5/2006 | LaChapelle et al. |
| 7,062,261 B2 | 6/2006 | Goldstein et al. |
| 7,108,560 B1 | 9/2006 | Chou et al. |
| 7,120,462 B2 | 10/2006 | Kumar |
| 7,127,678 B2 | 10/2006 | Bhesania et al. |
| 7,127,879 B2 | 10/2006 | Zhu et al. |
| 7,149,543 B2 | 12/2006 | Kumar |
| 7,155,545 B1 | 12/2006 | Wang |

| Patent/Pub No. | Date | Inventor |
|---|---|---|
| 7,167,112 B2 | 1/2007 | Andersen et al. |
| 7,167,935 B2 | 1/2007 | Hellberg |
| 7,187,947 B1 | 3/2007 | White et al. |
| 7,187,948 B2 | 3/2007 | Alden |
| 7,215,042 B2 | 5/2007 | Yan |
| 7,281,214 B2 | 10/2007 | Fadell |
| 7,293,122 B1 | 11/2007 | Schubert et al. |
| 7,293,227 B2 | 11/2007 | Plastina et al. |
| 7,299,304 B2 | 11/2007 | Saint-Hilaire et al. |
| 7,303,282 B2 | 12/2007 | Dwyer et al. |
| 7,304,685 B2 | 12/2007 | Park et al. |
| 7,305,254 B2 | 12/2007 | Findikli |
| 7,305,506 B1 | 12/2007 | Lydon et al. |
| 7,324,833 B2 | 1/2008 | White et al. |
| 7,362,963 B2 | 4/2008 | Lin |
| 7,363,129 B1 | 4/2008 | Barnicle et al. |
| 7,391,963 B2 | 6/2008 | Chen et al. |
| 7,415,563 B1 | 8/2008 | Holden et al. |
| 7,441,058 B1 | 10/2008 | Bolton et al. |
| 7,441,062 B2 | 10/2008 | Novotney et al. |
| 7,444,388 B1 | 10/2008 | Svendsen |
| 7,450,961 B1 | 11/2008 | Heubel et al. |
| 7,454,019 B2 | 11/2008 | Williams |
| 7,493,645 B1 | 2/2009 | Tranchina |
| 7,526,588 B1 | 4/2009 | Schubert et al. |
| 7,529,870 B1 | 5/2009 | Schubert et al. |
| 7,529,871 B1 | 5/2009 | Schubert et al. |
| 7,529,872 B1 | 5/2009 | Schubert et al. |
| 7,558,894 B1 * | 7/2009 | Lydon et al. ................ 710/105 |
| 7,587,540 B2 | 9/2009 | Novotney et al. |
| 7,590,783 B2 | 9/2009 | Lydon et al. |
| 7,610,350 B2 | 10/2009 | Abdulrahiman et al. |
| 7,634,605 B2 | 12/2009 | Laefer et al. |
| 7,660,929 B2 | 2/2010 | Novotney et al. |
| 7,670,263 B2 | 3/2010 | Ellis et al. |
| 7,673,020 B2 | 3/2010 | Rosenbloom et al. |
| 7,673,083 B2 | 3/2010 | Laefer et al. |
| 7,680,849 B2 | 3/2010 | Heller et al. |
| 7,757,026 B2 | 7/2010 | Novotney et al. |
| 7,779,185 B2 | 8/2010 | Schubert et al. |
| 7,791,319 B2 | 9/2010 | Veselic et al. |
| 7,797,471 B2 | 9/2010 | Laefer et al. |
| 7,853,746 B2 | 12/2010 | Novotney et al. |
| 7,877,532 B2 | 1/2011 | Schubert et al. |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2001/0042107 A1 | 11/2001 | Palm |
| 2002/0002035 A1 | 1/2002 | Sim et al. |
| 2002/0010759 A1 | 1/2002 | Hitson et al. |
| 2002/0015362 A1 | 2/2002 | Cowgill et al. |
| 2002/0025042 A1 | 2/2002 | Saito |
| 2002/0029303 A1 | 3/2002 | Nguyen |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0103008 A1 | 8/2002 | Rahn et al. |
| 2002/0105861 A1 | 8/2002 | Leapman |
| 2002/0108108 A1 | 8/2002 | Akaiwa et al. |
| 2002/0115480 A1 | 8/2002 | Huang |
| 2002/0116533 A1 | 8/2002 | Holliman et al. |
| 2002/0120850 A1 | 8/2002 | Walker et al. |
| 2002/0132651 A1 | 9/2002 | Jinnouchi |
| 2002/0151327 A1 | 10/2002 | Levitt |
| 2002/0152874 A1 | 10/2002 | Vilcauskas et al. |
| 2002/0156546 A1 | 10/2002 | Ramaswamy |
| 2002/0156949 A1 | 10/2002 | Kubo et al. |
| 2002/0161865 A1 | 10/2002 | Nguyen |
| 2002/0173273 A1 | 11/2002 | Spurgat et al. |
| 2002/0174269 A1 | 11/2002 | Spurgat et al. |
| 2002/0194621 A1 | 12/2002 | Tran et al. |
| 2003/0004934 A1 | 1/2003 | Qian |
| 2003/0011608 A1 | 1/2003 | Wada |
| 2003/0028664 A1 | 2/2003 | Tan et al. |
| 2003/0041206 A1 | 2/2003 | Dickie |
| 2003/0059022 A1 | 3/2003 | Nebiker et al. |
| 2003/0067741 A1 | 4/2003 | Alfonso et al. |
| 2003/0073432 A1 | 4/2003 | Meade |
| 2003/0079038 A1 | 4/2003 | Robbin et al. |
| 2003/0090988 A1 | 5/2003 | Chen |
| 2003/0097379 A1 | 5/2003 | Ireton |
| 2003/0110403 A1 | 6/2003 | Crutchfield et al. |
| 2003/0151621 A1 | 8/2003 | McEvilly et al. |
| 2003/0167318 A1 | 9/2003 | Robbin et al. |
| 2003/0172209 A1 | 9/2003 | Liu et al. |
| 2003/0185395 A1 | 10/2003 | Lee et al. |
| 2003/0198015 A1 | 10/2003 | Vogt |
| 2003/0212895 A1 | 11/2003 | Kisliakiv |
| 2003/0215102 A1 | 11/2003 | Marlowe |
| 2003/0220988 A1 | 11/2003 | Hymel |
| 2003/0236075 A1 | 12/2003 | Johnson et al. |
| 2003/0237043 A1 | 12/2003 | Novak et al. |
| 2004/0003300 A1 | 1/2004 | Malueg et al. |
| 2004/0019497 A1 | 1/2004 | Volk et al. |
| 2004/0039860 A1 | 2/2004 | Mills et al. |
| 2004/0048569 A1 | 3/2004 | Kawamura |
| 2004/0055446 A1 | 3/2004 | Robbin et al. |
| 2004/0090998 A1 | 5/2004 | Chen |
| 2004/0103223 A1 | 5/2004 | Gabehart et al. |
| 2004/0116005 A1 | 6/2004 | Choi |
| 2004/0151327 A1 | 8/2004 | Marlowe |
| 2004/0162029 A1 | 8/2004 | Grady |
| 2004/0164708 A1 | 8/2004 | Veselic et al. |
| 2004/0172533 A1 | 9/2004 | DeMello et al. |
| 2004/0186935 A1 | 9/2004 | Bel et al. |
| 2004/0194154 A1 | 9/2004 | Meadors et al. |
| 2004/0198436 A1 | 10/2004 | Alden |
| 2004/0224638 A1 | 11/2004 | Fadell et al. |
| 2004/0235339 A1 | 11/2004 | Sato et al. |
| 2004/0249994 A1 | 12/2004 | Shapiro et al. |
| 2004/0252966 A1 | 12/2004 | Holloway et al. |
| 2004/0267812 A1 | 12/2004 | Harris et al. |
| 2004/0267825 A1 | 12/2004 | Novak et al. |
| 2004/0268397 A1 | 12/2004 | Dunbar et al. |
| 2005/0001589 A1 | 1/2005 | Edington |
| 2005/0014119 A1 | 1/2005 | Rudakov |
| 2005/0014531 A1 | 1/2005 | Findikli |
| 2005/0014536 A1 | 1/2005 | Grady |
| 2005/0015355 A1 | 1/2005 | Heller et al. |
| 2005/0018768 A1 | 1/2005 | Mabey et al. |
| 2005/0022212 A1 | 1/2005 | Bowen |
| 2005/0047071 A1 | 3/2005 | Tse Chun Hin |
| 2005/0080915 A1 | 4/2005 | Shoemaker et al. |
| 2005/0135790 A1 | 6/2005 | Hutten |
| 2005/0138433 A1 | 6/2005 | Linetsky |
| 2005/0149213 A1 | 7/2005 | Guzak et al. |
| 2005/0181756 A1 | 8/2005 | Lin |
| 2005/0198189 A1 | 9/2005 | Robinson et al. |
| 2005/0207726 A1 | 9/2005 | Chen |
| 2005/0227612 A1 | 10/2005 | Helstrom et al. |
| 2005/0239333 A1 | 10/2005 | Watanabe et al. |
| 2005/0240705 A1 | 10/2005 | Novotney et al. |
| 2005/0246375 A1 | 11/2005 | Manders et al. |
| 2005/0251565 A1 | 11/2005 | Weel |
| 2005/0281185 A1 | 12/2005 | Kawasaki |
| 2006/0015826 A1 | 1/2006 | Shiozawa et al. |
| 2006/0031545 A1 | 2/2006 | Manders et al. |
| 2006/0056796 A1 | 3/2006 | Nishizawa et al. |
| 2006/0088228 A1 | 4/2006 | Marriott et al. |
| 2006/0116009 A1 | 6/2006 | Langberg et al. |
| 2006/0143680 A1 | 6/2006 | Adachi |
| 2006/0156415 A1 | 7/2006 | Rubinstein et al. |
| 2006/0161621 A1 | 7/2006 | Rosenberg |
| 2006/0163358 A1 | 7/2006 | Biderman |
| 2006/0168298 A1 | 7/2006 | Aoki et al. |
| 2006/0184456 A1 | 8/2006 | de Janasz |
| 2006/0188237 A1 | 8/2006 | Watanabe et al. |
| 2006/0205349 A1 | 9/2006 | Passier et al. |
| 2006/0224620 A1 | 10/2006 | Silverman et al. |
| 2006/0236245 A1 | 10/2006 | Agarwal et al. |
| 2006/0247851 A1 | 11/2006 | Morris |
| 2006/0258289 A1 | 11/2006 | Dua |
| 2006/0277555 A1 | 12/2006 | Howard |
| 2006/0294209 A1 | 12/2006 | Rosenbloom et al. |
| 2007/0018947 A1 | 1/2007 | Toro-Lira |
| 2007/0056012 A1 | 3/2007 | Kwon et al. |
| 2007/0056013 A1 | 3/2007 | Duncan |
| 2007/0070856 A1 | 3/2007 | Tebele |

| | | | |
|---|---|---|---|
| 2007/0080823 A1 | 4/2007 | Fu et al. | |
| 2007/0083750 A1 | 4/2007 | Miura et al. | |
| 2007/0083814 A1 | 4/2007 | Wilbrink et al. | |
| 2007/0086724 A1 | 4/2007 | Grady et al. | |
| 2007/0106760 A1 | 5/2007 | Houh et al. | |
| 2007/0130592 A1 | 6/2007 | Haeusel | |
| 2007/0173197 A1 | 7/2007 | Hsiung | |
| 2007/0173294 A1 | 7/2007 | Hsiung | |
| 2007/0206827 A1 | 9/2007 | Tupman et al. | |
| 2007/0209081 A1 | 9/2007 | Morris | |
| 2007/0226238 A1 | 9/2007 | Kiilerich et al. | |
| 2007/0226384 A1 | 9/2007 | Robbin et al. | |
| 2007/0233294 A1 | 10/2007 | Holden et al. | |
| 2007/0233295 A1 | 10/2007 | Laefer et al. | |
| 2007/0234420 A1 | 10/2007 | Novotney et al. | |
| 2007/0236482 A1 | 10/2007 | Proctor et al. | |
| 2007/0247794 A1 | 10/2007 | Jaffe et al. | |
| 2007/0300155 A1 | 12/2007 | Laefer et al. | |
| 2008/0025172 A1 | 1/2008 | Holden et al. | |
| 2008/0034325 A1 | 2/2008 | Ording | |
| 2008/0055272 A1 | 3/2008 | Anzures et al. | |
| 2008/0065722 A1 | 3/2008 | Brodersen et al. | |
| 2008/0188209 A1 | 8/2008 | Dorogusker et al. | |
| 2009/0013096 A1 | 1/2009 | Novotney et al. | |
| 2009/0013110 A1 | 1/2009 | Novotney et al. | |
| 2009/0013253 A1 | 1/2009 | Laefer et al. | |
| 2009/0125134 A1 | 5/2009 | Bolton et al. | |
| 2009/0132076 A1 | 5/2009 | Holden et al. | |
| 2009/0198361 A1 | 8/2009 | Schubert et al. | |
| 2009/0204244 A1 | 8/2009 | Schubert et al. | |
| 2009/0204738 A1 | 8/2009 | Schubert et al. | |
| 2009/0210079 A1 | 8/2009 | Schubert et al. | |
| 2009/0292835 A1 | 11/2009 | Novotney et al. | |
| 2009/0299506 A1 | 12/2009 | Lydon et al. | |
| 2010/0049350 A1 | 2/2010 | Laefer et al. | |
| 2010/0106879 A1 | 4/2010 | Laefer et al. | |

FOREIGN PATENT DOCUMENTS

| | | |
|---|---|---|
| EP | 1150472 A2 | 10/2001 |
| EP | 1367734 A1 | 12/2003 |
| EP | 1498899 A1 | 1/2005 |
| EP | 1594319 A1 | 11/2005 |
| EP | 1672613 A2 | 6/2006 |
| GB | 2405718 A | 3/2005 |
| JP | 07-176351 A | 7/1995 |
| JP | 10-321302 A | 4/1998 |
| JP | 10-334993 A | 12/1998 |
| JP | 11-288420 A | 10/1999 |
| JP | 2000-214953 A | 8/2000 |
| JP | 2000-223215 A | 8/2000 |
| JP | 2000-223216 A | 8/2000 |
| JP | 2000-223218 A | 8/2000 |
| JP | 2001-035603 A | 2/2001 |
| JP | 2001-069165 A | 3/2001 |
| JP | 2001-196133 A | 7/2001 |
| JP | 2001-230021 A | 8/2001 |
| JP | 2001-332350 A | 11/2001 |
| JP | 2002-025720 A | 1/2002 |
| JP | 2002-14304 A | 5/2002 |
| JP | 2002-203641 A | 7/2002 |
| JP | 2002245719 A | 8/2002 |
| JP | 2002-252566 A | 9/2002 |
| JP | 3090747 U | 10/2002 |
| JP | 2002-342659 A | 11/2002 |
| JP | 2002-374447 A | 12/2002 |
| JP | 2003-017165 A | 1/2003 |
| JP | 2003-032351 A | 1/2003 |
| JP | 2003-058430 A | 2/2003 |
| JP | 2003-274386 A | 9/2003 |
| JP | 2004-078538 A | 3/2004 |
| JP | 2004-259280 A | 9/2004 |
| JP | 2008071419 A | 3/2007 |
| JP | 2008053955 A | 3/2008 |
| JP | 2009303001 A | 12/2009 |
| TW | 530267 | 5/2003 |
| WO | WO 99/26330 | 5/1999 |
| WO | WO 99/48089 A2 | 9/1999 |
| WO | WO 00/39907 | 7/2000 |
| WO | WO 00/60450 A1 | 10/2000 |
| WO | WO 02/49314 A2 | 6/2002 |
| WO | WO 03/036541 A1 | 5/2003 |
| WO | WO 03/036957 A1 | 5/2003 |
| WO | WO 03056776 A1 | 7/2003 |
| WO | WO 03/073688 | 9/2003 |
| WO | WO 2004/084413 A2 | 9/2004 |
| WO | WO 2004-095772 A1 | 11/2004 |
| WO | WO 2004/112311 A1 | 12/2004 |
| WO | WO 2005/109781 A1 | 11/2005 |
| WO | WO 2005/119463 A2 | 12/2005 |
| WO | WO 2006/071364 A1 | 6/2006 |
| WO | WO 2006/073702 A1 | 7/2006 |
| WO | WO 2006/080957 A2 | 8/2006 |

OTHER PUBLICATIONS

Anonymous, "Future of Digital Music in Windows," Microsoft Windows Hardware Developer Central Archive, Dec. 4, 2001[Online], [retrieved on Jan. 15, 2008]. <URL:http://www.microsoft.com/whdc/archive/digitaudio.mspx> 3 pages.

Anonymous, "Introduction to Digital Audio," Microsoft Windows Hardware Developer Central Archive, Dec. 4, 2001 [Online], [retrieved on Jan. 15, 2008]. <URL:http://www.microsoft.com/whdc/archive/digitaudio.mspx> 2 pages.

Anonymous, "Windows and Red Book Audio," Microsoft Windows Hardware Developer Central Archive, Dec. 4, 2001 [Online], [retrieved Jan. 15, 2008]. <URL:http://www.microsoft.com/whdc/archive/Dmfuture.mspx> 2 pages.

"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html p. 7.

Belkin iPod Voice Recorder, Product Specification Sheet, printed Jun. 16, 2004.

Bindra, "Standard Turns Monitor into I/O Hub," Electronic Engineering Times, vol. 918, Sep. 6, 1996, p. 14.

Brentrup, "Introduction to Public Key Cryptography Demystified," Campus Technology, printed from http://www.campus-technology.com/article.asp?id=7626 on Oct. 6, 2004.

Brown, "Making UBS Work," downloaded Oct. 16, 2001, PC Magazine: PC Tech wysiwyg:/155/http://www.zdnet.com/pcmag/pctech/content!18/04/tu1804.001.html.

"Cables to Go," download Oct. 16, 2001 http://www.cablestogo.com/product.asp?cat%5Fid=601&sku=27028.

Crawford et al., "Sample rate conversion and bit rate reduction in the studio," IEEE Colloquium on Digital Audio Signal Processing, May 22, 1991, pp. 8/1-8/3.

Derman, "Monitors Make Net Connections," Electronic Engineering Times, vol. 933, 1996, pp. 60 and 69.

"ExpressBus™ F5U0I0," User Guide Packing Checklist, Belkin Components Product Warranty.

"FireWire", downloaded Oct. 16, 2001, siwyg://4 2/http://developer.apple.comlhardwarelFire Wire.

"Fire Wire Connector," downloaded Oct. 16, 2001, wysiwyg://76/http://developerapple.com/...es/Macintosh_CPUs-G3/ibook/ibook-27.html.

Fried, "FireWire poised to become ubiquitous," downloaded Oct. 16, 2001, CNET News.com, 1394 Trade Association: Press, wysiwyg:/132/http:// 113 94ta.org/Press/200 1 Press/august!8.2 7. b.html.

Fried, "New Fire Wire to blaze faster trail," downloaded Oct. 16, 2001, CNET News.com, http://news.cnet.com/news/0-I006-200-6021210.html.

"How to Connect Your Computer PC Hardware", downloaded Oct. 16, 2001, http:///www.scar.utoronto.ca!~ccweb/faculty/connect-howto.html.

"IEEE 1394/USB Comparison," downloaded Oct. 16, 2001, www.genitech.com.aulLIBRARY/TechSupportiinfobits/firewirevsusb.html.

"Introduction to Public Key Cryptography," Oct. 9, 1998, printed from http://developer.netscape.com/docs/manuals/security/pkin/contents.html on Oct. 6, 2004.

iPod Classic User's Guide, acquired from apple.com, 2002; 44 pages.
iPod nano Features Guide, acquired from apple.com, 2008; 72 pages.
iPod touch User's Guide, acquired from apple.com, 2008, 120 pages.

"iPodDock/iPod Cradle," www.bookendzdocks.com/bookendz/dock_cradle.html, downloaded Feb. 27, 2003.

Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, XP000175146 ISSN: 1549-4950 figures 9, 10.

Lewis, "On Technology" Fortune Magazine, Dec. 9, 2002, p. 240.

MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. 2 pages.

MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

Menezes et al., "Handbook of Applied Cryptography," Identification and Entity Authentication, pp. 385-424.

Microsoft, "Media Transport Protocol Implementation Details," 2005, 18 pages.

"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document, 70 pages.

Networking Tech Note, "1394 Standards and Specifications," 3 pgs.

"Neuros MP3 Digital Audio Computer," www.neurosaudio.com, downloaded Apr. 9, 2003, 6 pages.

"PMC FW2 IEEE1394 FireWire Controller", downloaded Oct. 16, 2001, http://www.bvmltd.co.uk/PMCfw2ds.html.

Severance, "FireWire Finally Comes Home," Michigan State University, Standards, Nov. 1998, pp. 117-118.

Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.

Teener, "Understanding Fire Wire: The IEEE 1394 Standards and Specifications," downloaded Oct. 16, 2001, wysiwyg:119/http:1Iwww.chipcenter.com/networking/ieee 1394/main.html.

"The Authoritative Dictionary of IEEE Standards Terms, Seventh Edition," Published by Standards Information Network, IEEE Press, 2000, 3 pages.

"Universal Serial Bus Specification—Rev 2.0," Chapter 6, Compaq Hewlett-Packard, Apr. 27, 2000, pp. 85, 99-100.

"Universal Serial Bus Specification—Rev 2.0," XP002474828, Chapter 9, USB Device Framework, pp. 239-274.

Vitaliano, "Why FireWire is Hot!Hot!Hot!" downloaded Oct. 16, 2001, "Impact.FireWire.SideBar" http://www.vxm.com/21R.35.html.

Whittle, "Public Key Authentication Framework: Tutorial," First Principles Consulting, Jun. 2, 1996, downloaded Oct. 6, 2004, http://www.ozemail.com.au/~firstpr/crypto/pkaftute.htm, 8 pages.

U.S. Appl. No. 12/610,966, filed Nov. 2, 2009, Laefer et al.

Chen et al., "Design and Implemeation of a Hard Disk-Based Entertainment Device for Managing Media Contents on the Go," Consumer Electronics, 1005. (ISCE 2005). Proceedings of the Ninth International Symposium on, pp. 328-333, Jun. 14-16, 2005. (6 Pages).

LSI Logic's Broadcast PC Card Brings New Multimedia Capabilities to Personal Computing. (Nov. 16). PR Newswire, 1. Retrieved Jun. 26, 2010, from Business Dateline. (3 Pages).

Nomad II Player Version 1.0 (CLI) (User's Manual), Creative Technology, Ltd., Jan. 2000 (46 pages).

Slay et al., "iPod Forensics: Forencically Sound Examination of an Apple iPod," *System Sciences*, 2007. HICSS 2007. 40th Annual Hawaii International Conference on, pp. 1-9, Jan. 2007. (9 Pages).

* cited by examiner

| Pin | Signal Name | I/O | Function |
|---|---|---|---|
| 1 | DGND | GND | Digital Ground |
| 2 | DGND | GND | Digital Ground |
| 3 | TPA+ | I/O | FireWire signal |
| 4 | USB D+ | I/O | USB signal |
| 5 | TPA- | I/O | FireWire signal |
| 6 | USB D- | I/O | USB signal |
| 7 | TPB+ | I/O | FireWire signal |
| 8 | USB PWR | I | USB power in; used to detect USB hub |
| 9 | TPB- | I/O | FireWire signal |
| 10 | Accessory Identify | I | Connection for accessory identification resistor |
| 11 | F/W PWR+ | I | Firewire and charger input power (8V to 15V dc) |
| 12 | F/W PWR+ | I | Firewire and charger input power (8V to 15V dc) |
| 13 | ACCESSORY PWR | O | Nominal 3.3V output; current limited to 100 mA |
| 14 | Reserved | | |
| 15 | DGND | GND | Digital Ground |
| 16 | DGND | GND | Digital Ground |
| 17 | Reserved | | |
| 18 | Rx | I | Serial protocol input to media player |
| 19 | Tx | O | Serial protocol output from media player |
| 20 | Accessory Detect | I | Connection for accessory identification resistor |
| 21 | S Video Y | O | Luminance component for S-video |
| 22 | S Video C | O | Chrominance component for S-video |
| 23 | Composite Video | O | Composite video signal |
| 24 | Remote sense | I | Detect remote |
| 25 | LINE-IN L | I | Line level input for left audio channel |
| 26 | LINE-IN R | I | Line level input for right audio channel |
| 27 | LINE-OUT L | O | Line level output to left audio channel |
| 28 | LINE-OUT R | O | Line level output to right audio channel |
| 29 | Audio Return | — | Signal, not to be grounded in accessory |
| 30 | DGND | GND | Digital ground |
| 31 | Chassis | | Chassis ground for connector shell |
| 32 | Chassis | | Chassis ground for connector shell |

| Pin | Signal Name | I/O | Function |
|---|---|---|---|
| 1 | Audio. Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data from iPod from Device) |
| 9 | D GND | GND | Digital ground for accessory |

METHOD AND SYSTEM FOR CONTROLLING POWER PROVIDED TO AN ACCESSORY

CROSS-REFERENCE TO RELATED APPLICATIONS

This application is a continuation of U.S. application Ser. No. 11/519,278, entitled "Method and System For Controlling Power Provided To An Accessory", filed on Sep. 11, 2006, the disclosure of which is incorporated by reference herein.

This application is related to U.S. patent application Ser. No. 10/833,689, entitled "Connector Interface System for a Multi-Communication Device", filed on Apr. 27, 2004, now U.S. Pat. No. 7,441,062, assigned to the assignee of the present application, the disclosure of which is incorporated by reference herein.

This application is related to U.S. patent application Ser. No. 11/519,386, entitled "Method and System for Controlling an Accessory Having a Tuner", filed on Sep. 11, 2006, now U.S. Pat. No. 7,441,058, assigned to the assignee of the present application, the disclosure of which is incorporated by reference herein.

This application is related to U.S. patent application Ser. No. 11/519,541, "Method and System for Controlling Video Selection and Playback in a Portable Media Player", filed on Sep. 11, 2006, assigned to the assignee of the present application, the disclosure of which is incorporated by reference herein.

FIELD OF THE INVENTION

The present invention relates generally to electrical devices and more particularly to electrical devices such as portable media players that communicate with accessory devices.

BACKGROUND OF THE INVENTION

A portable media player stores media assets, such as audio tracks, video tracks or photos that can be played or displayed on the portable media player. One example of a portable media player is the iPod® media player, which is available from Apple Inc. of Cupertino, Calif. Often, a portable media player acquires its media assets from a host computer that serves to enable a user to manage media assets. As an example, the host computer can execute a media management application to manage media assets. One example of a media management application is iTunes®, version 6.0, produced by Apple Inc.

A portable media player typically includes one or more connectors or ports that can be used to interface to the portable media player. For example, the connector or port can enable the portable media player to couple to a host computer, be inserted into a docking system, or receive an accessory device. There are today many different types of accessory devices that can interconnect to the portable media player. For example, a remote control can be connected to the connector or port to allow the user to remotely control the portable media player. As another example, an automobile can include a connector and the portable media player can be inserted onto the connector such that an automobile media system can interact with the portable media player, thereby allowing the media content on the portable media player to be played within the automobile. In another example, a digital camera can be connected to the portable media player to download images and the like. In many cases the accessory utilizes power when connected to the portable media player.

Accordingly, it may be desirable for the portable media player to control the power provided to and utilized by the accessory when coupled thereto. Therefore, it may also be desirable to provide a method and system for allowing a portable media player to efficiently and effectively control the power of the accessory. The present invention addresses such a need.

SUMMARY OF THE INVENTION

A method for a portable media player to control power provided an accessory is disclosed. The method includes requesting information about the power capabilities of the accessory by the portable media player. The method further includes providing information about the power capabilities of the accessory by the accessory to the portable media player, and utilizing the information to set the power of the accessory.

A method and system in accordance with the present invention provides a system that allows a portable media player to obtain information from an accessory concerning its power requirements. A portable media player can then utilize the power requirements information to allow for the powering of the accessory when connected to the portable media player.

DETAILED DESCRIPTION OF THE INVENTION

The present invention relates generally to consumer electronic devices and more particularly to consumer electronic devices such as portable media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention provides a system that allows a portable media player to obtain information from an accessory concerning the accessory's power requirements. A portable media player can then utilize this information to provide power to the accessory when the accessory is connected to the portable media player. In one embodiment, commands are utilized to facilitate communication of this power information between the portable media player and the accessory.

In a system and method in accordance with the present invention, the portable media player is a master device and an accessory device is a slave device. In an embodiment, commands are defined to acknowledge a command with status, to set the bus power state, and to obtain a current power state and then set the power state for the accessory. To describe the features of the present invention in more detail refer now to the following discussion in conjunction with the accompanying Figures.

Figure 1:
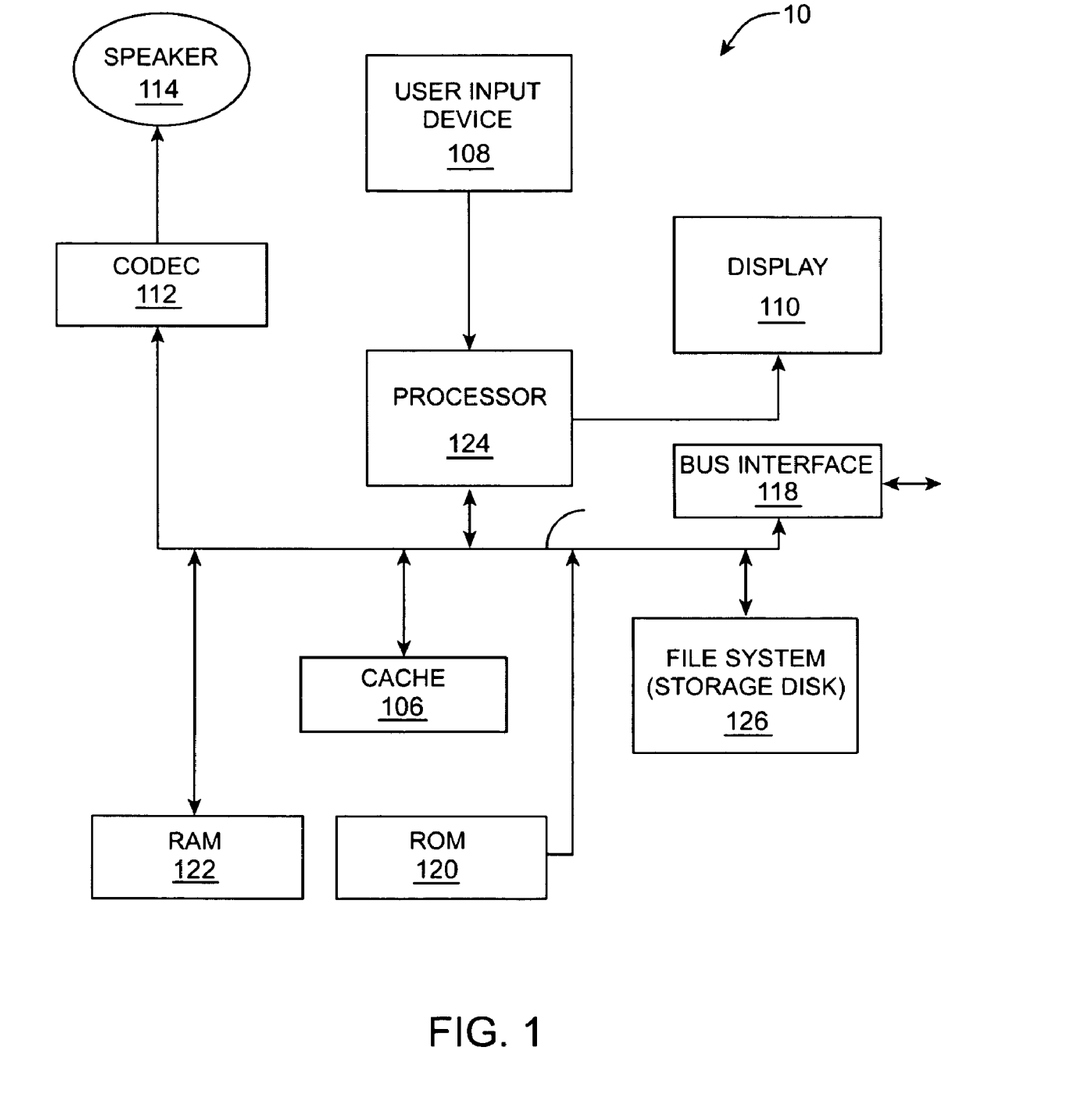
FIG. 1 shows a simplified block diagram of an exemplary portable media player, in accordance with an embodiment of the invention.

FIG. 1 shows a simplified block diagram for an exemplary portable media player 10 in accordance with an embodiment of the invention. The portable media player 10 includes a processor 124 that pertains to a microprocessor or controller for controlling the overall operation of the portable media player 10. The portable media player 10 stores media data pertaining to media assets in a file system 126 and a cache 106. The file system 126 typically provides high capacity storage capability for the portable media player 10. However, to improve access time to the file system 126, the portable media player 10 can also include a cache 106. The cache 106 may be, for example, random-access memory (RAM). The access time to the cache 106 is substantially shorter than for the file system 126. However, the cache 106 typically does not have the large storage capacity of the file system 126. Further, the file system 126, when active, consumes more power than does the cache 106. The power consumption is particularly important when the portable media player 10 is powered by a battery (not shown). The portable media player 10 also includes additional RAM 122 and a read-only memory (ROM) 120. The ROM 120 can store programs to be executed by the processor 124. The RAM 122 provides volatile data storage, such as for the cache 106.

The portable media player 10 also includes a user input device 108 that allows a user of the portable media player 10 to interact with the portable media player 10. For example, the user input device 108 can take a variety of forms, such as a button, keypad, touch screen, dial, etc. Still further, the portable media player 10 includes a display 110 (screen display) that can be controlled by the processor 124 to display information as well as photos and video tracks to the user. A data bus 113 can facilitate data transfer between at least the file system 126, the cache 106, the processor 124, and other functional blocks. The portable media player 10 also includes a bus interface 116 that couples to a data link 118. The data link 118 allows the portable media player 10 to couple to a host computer that can be a stand alone host computer or part of an interconnected network of computers, such as the Internet or other such distributed systems.

In one embodiment, the portable media player 10 serves to store a plurality of media assets (e.g., songs, videos, photos) in the file system 126. When a user desires to have the portable media player 10 play a particular media item, a list of available media assets is displayed on the display 110. Then, using the user input device 108, a user can select one of the available media assets. The processor 124, upon receiving a selection of a particular media item, such as an audio file, supplies the media data for the particular media item to a coder/decoder (CODEC) 112 via bus 113. The CODEC 112 then produces analog output signals for a speaker 114. The speaker 114 can be a speaker internal to the portable media player 10 or external to the portable media player 10. For example, headphones or earphones that connect to the portable media player 10 would be considered an external speaker. In other applications, media asset files stored on the host computer or in other computers coupled to the host computer by way of the network can be transferred (otherwise referred to as downloaded) to the file system 126 (or the cache 106). These media assets could also be, for example, videos or photos which could be provided to the display 110 via a video processor (not shown) either coupled to or within the processor 124. In this way, the user has available any number and type of media asset files for play by the portable media player 10.

For example, in a particular embodiment, the available media assets are arranged in a hierarchical manner based upon a selected number and type of groupings appropriate to the available media assets. In the case where the portable media player 10 is an MP3 type media player, the available media assets take the form of MP3 files (each of which corresponds to a digitally encoded song or other rendition) stored at least in part in the file system 126. The available media assets (in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, a list of songs for each album listed in the third level at a fourth level and so on.

A method and system in accordance with the present invention can be utilized with a portable media player and its associated accessory in a variety of environments. One such environment is within a connector interface system that is described in detail hereinbelow. The connector interface system allows for the media player and the accessory to communicate utilizing interface signals over at least one of the pins of the connector interface system.

Connector Interface System Overview

To describe the features of the connector interface system in accordance with the present invention in more detail, refer now to the following description in conjunction with the accompanying drawings.

Docking Connector

Figure 2A:
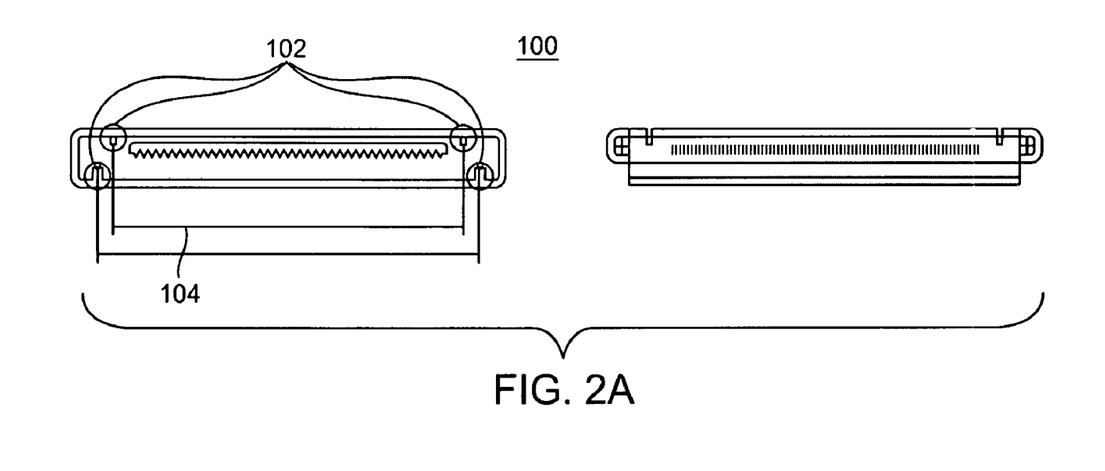
FIGS. 2A and 2B illustrate a docking connector in accordance with the present invention.
Figure 2B:
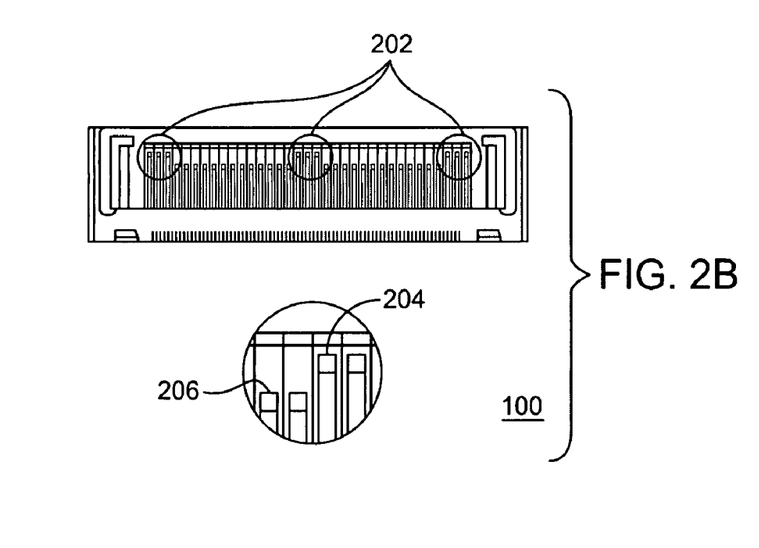

FIGS. 2A and 2B illustrate a docking connector 100 in accordance with the present invention. Referring first to FIG. 2A, the keying features 102 are of a custom length 104. In addition, a specific key arrangement where one set of keys are separated by one length at the bottom and another set of keys are separated by another length at the top of the connector is used. The use of this key arrangement prevents noncompliant connectors from being plugged in and potentially causing damage to the device. The connector for power utilizes a Firewire specification for power. The connector includes a first make/last break contact to implement this scheme. FIG. 2B illustrates the first make/last break contact 202 and also illustrates a ground pin 204 and a power pin 206 related to providing an appropriate first make/last break contact. In this example, the ground pin 204 is longer than the power pin 206. Therefore, the ground pin 204 would contact its mating pin in the docking accessory before the power pin 206, and the risk of internal electrical damage to the electronics of the device is minimized. Further details of an exemplary embodiment for the docking connector 100 are described in U.S. Pat. No. 6,776,660 entitled CONNECTOR, which issued on Aug. 17, 2004 and is incorporated herein by reference in its entirety.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the portable media player.

Remote Connector

Figure 3A:
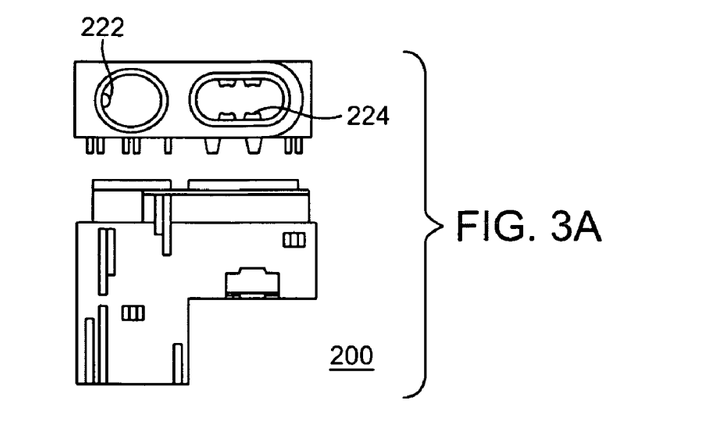
FIG. 3A is a front and top view of a remote connector in accordance with the present invention.
Figure 3B:
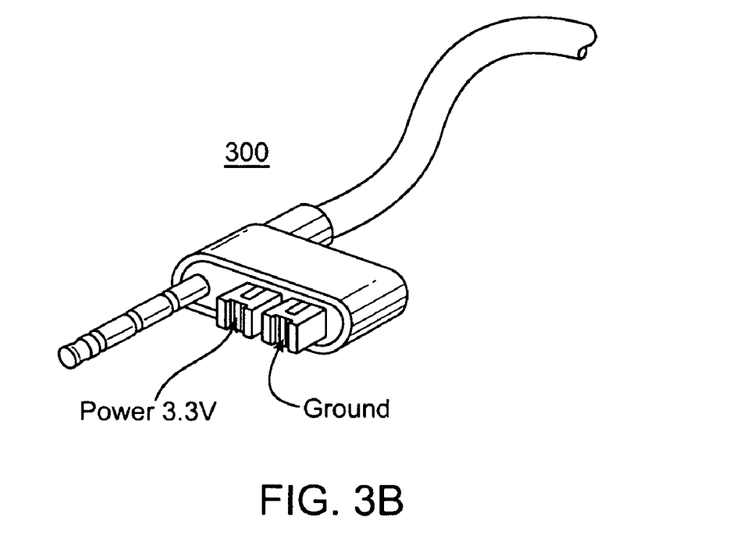
FIG. 3B illustrates a plug to be utilized in the remote connector.
Figure 3C:
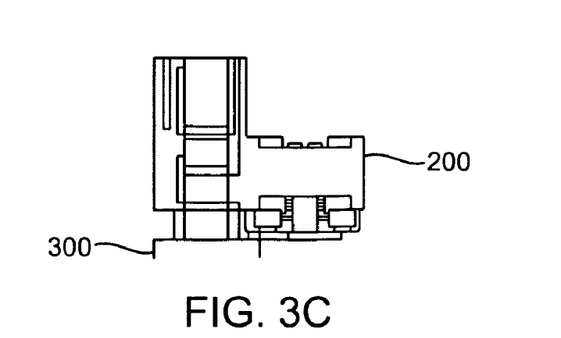
FIG. 3C illustrates the plug inserted into the remote connector.

The connector interface system also includes a remote connector which provides for the ability to output audio and input audio, provides I/O serial protocol, and provides the ability to input video and output video. FIG. 3A is a front and top view of a remote connector 200 in accordance with the present invention. As is seen, the remote connector 200 includes a top headphone receptacle 222, as well as a second receptacle 224 for remote devices. FIG. 3B illustrates a plug 300 to be utilized in the remote connector. The plug 300 allows these features to be provided via the remote connector. FIG. 3C illustrates the plug 300 inserted into the remote connector 200. Heretofore, all these features have not been implemented in a remote connector. Therefore, a standard headphone cable can be plugged in, and special remote control cables, microphone cables, and video cables could also be utilized with the remote connector.

To describe the features of the connector interface system in more detail, provided below is a functional description of the docking connector, remote connector and a command set in accordance with the present invention.

Docking and Remote Connector Specifications

Figure 4A:
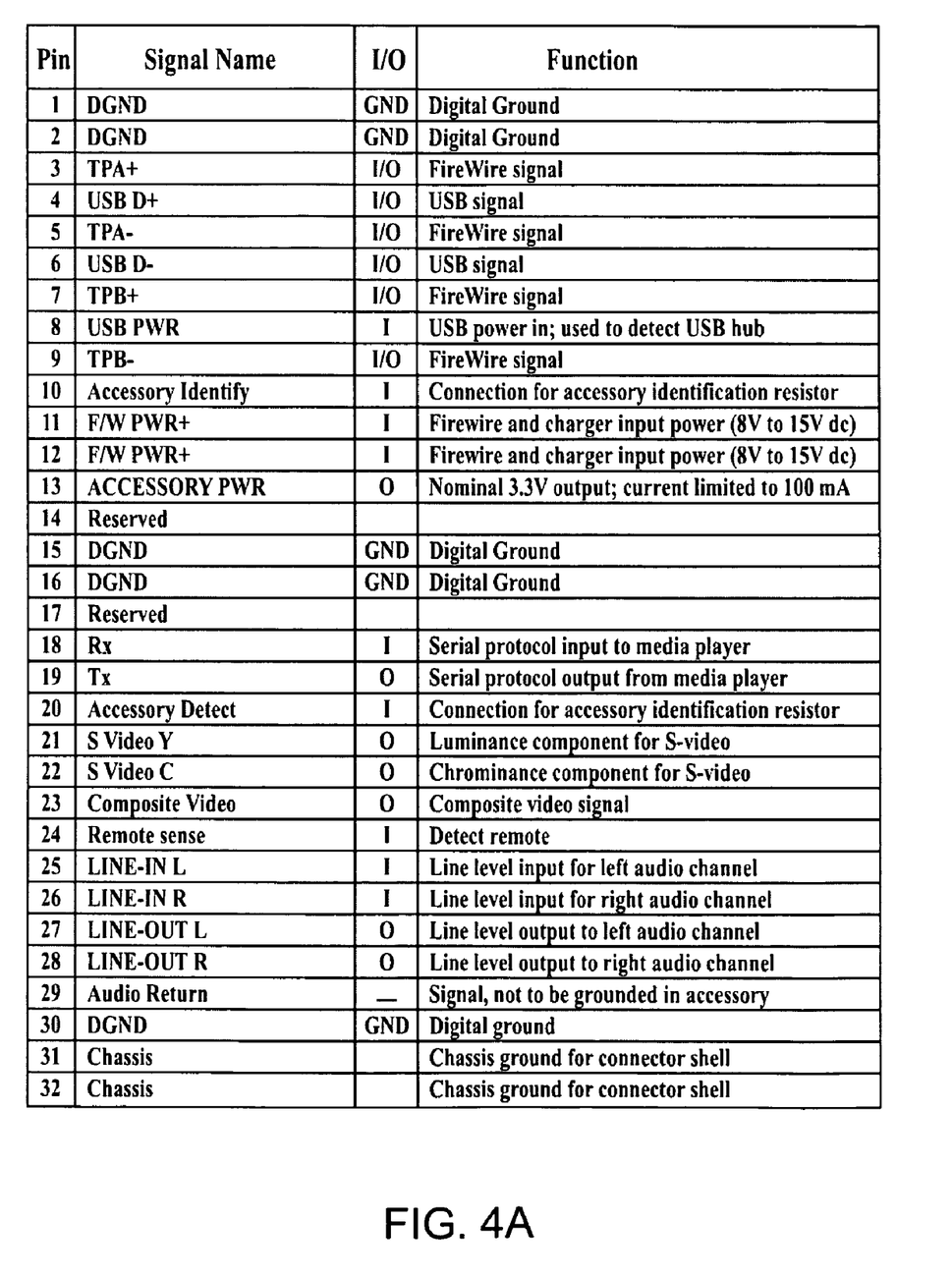
FIG. 4A illustrates the connector pin designations for the docking connector.
Figure 4B:
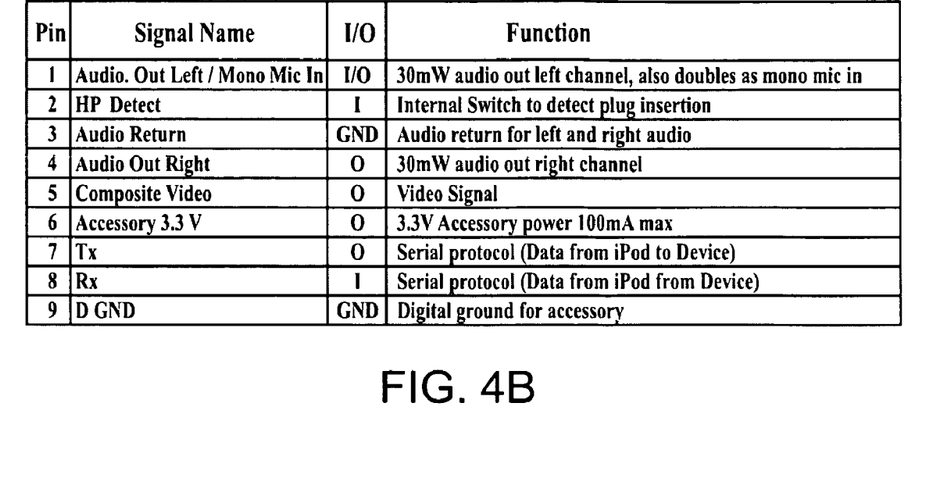
FIG. 4B illustrates the connection pin designations for the remote connector.

For an example of the connector pin designations for both the docking connector and for the remote connector for a portable media player such as an iPod device by Apple Inc., refer now to FIGS. 4A and 4B. FIG. 4A illustrates the connector pin designations for the docking connector. FIG. 4B illustrates the connection pin designations for the remote connector.

Docking Connector Specifications

Figure 5A:
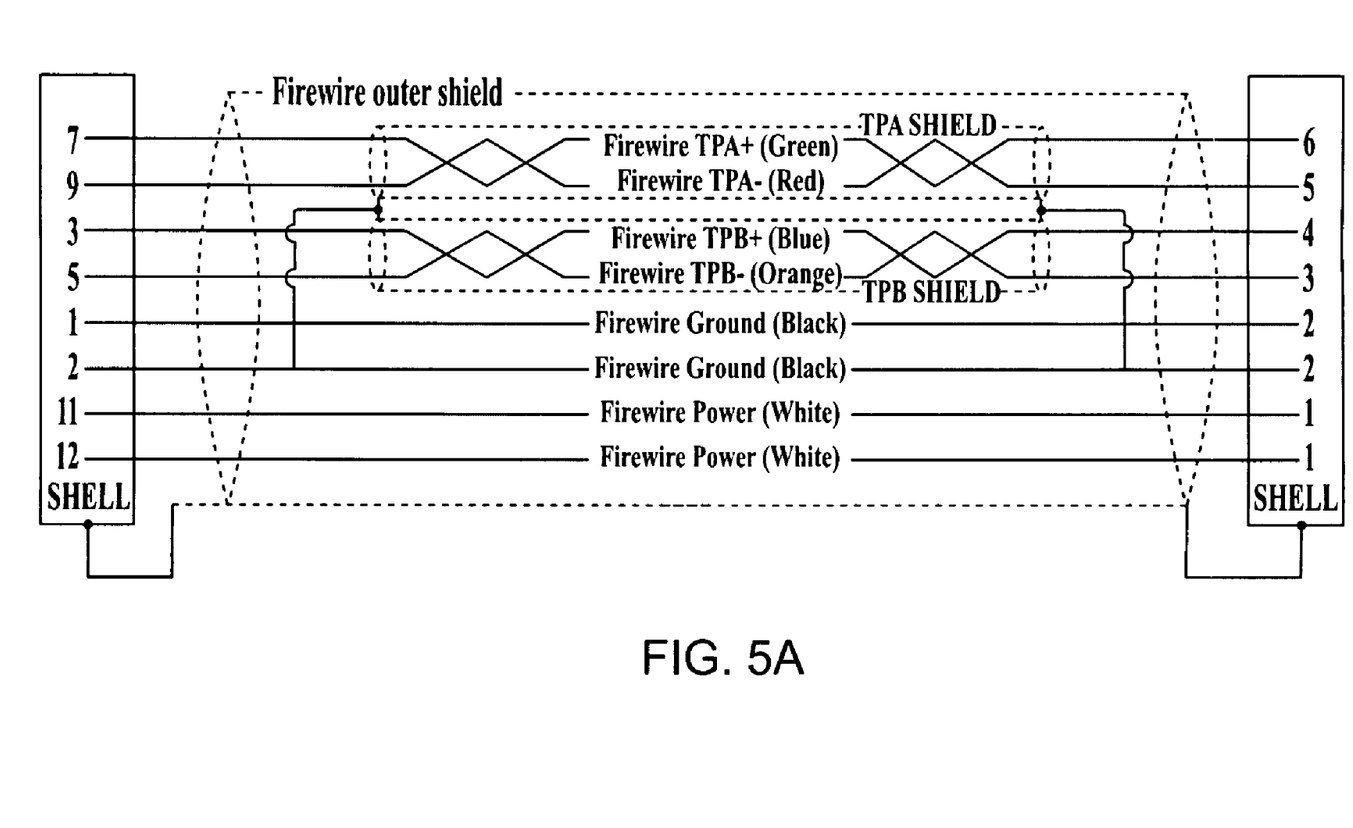
FIG. 5A illustrates a typical FireWire connector interface for the docking connector.

FIG. 5A illustrates a typical Firewire connector interface for the docking connector.

Firewire Power:
a) 8V-30V DC IN
b) 10 W Max
Firewire Signal:
a) Designed to IEEE I394 A Spec (400 Mb/s)
USB Interface In one embodiment, the portable media player provides two configurations, or modes, of USB device operation: mass storage and portable media player USB Interface (MPUI). The MPUI allows the portable media player to be controlled using an accessory protocol. What is meant by an accessory protocol is the software component of the media player that communicates with accessories over a given transport layer.

Accessory Power

Figure 5B:
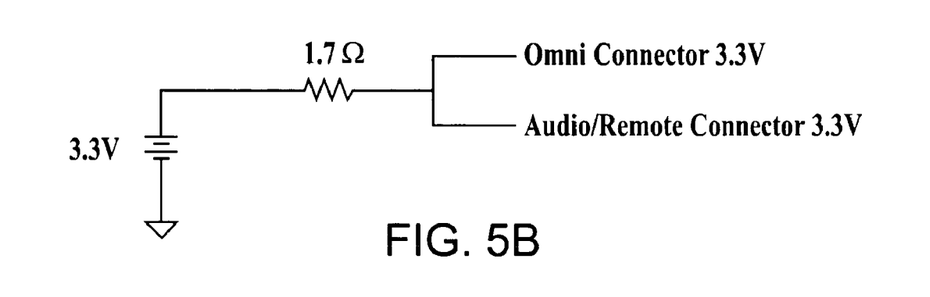
FIG. 5B illustrates a reference schematic diagram for an accessory power source.

FIG. 5B illustrates the accessory power source. The portable media player accessory power pin supplies voltages, for example, 3.0 V to 3.3V+/−5% (2.85 V to 3.465 V) over the docking connector and remote connector (if present). A maximum current is shared between the docking connector and the remote connector.

By default, the portable media player supplies a particular current such as 5 mA. An appropriate software accessory detection system can be employed to turn on high power (for example, up to 100 mA) during active device usage. When devices are inactive, they typically consume less than a predetermined amount of power such as 5 mA current.

Accessory power is switched off for a period of, for example, approximately 2 seconds during the powering up of the portable media player. This is done to ensure that accessories are in a known state and can be properly detected. In one embodiment, accessories are responsible for re-identifying themselves after the portable media player transitions accessory power from the off to the on state.

Accessory power is grounded through the Digital Ground (DGND) pins.

Figure 5C:
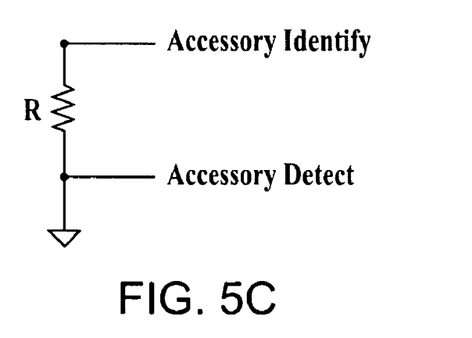
FIG. 5C illustrates a reference schematic diagram for a system for detecting and identifying accessories for the docking connector.

FIG. 5C illustrates a reference schematic diagram for a system for detecting and identifying accessories for the docking connector. The system comprises a resistor (R) to ground that allows the device to determine what type of accessory has been plugged into the docking connector and two identify and detect pins (Accessory Identify (pin 10, FIG. 4A) and Accessory Detect (pin 20, FIG. 4A)).

Figure 5D:
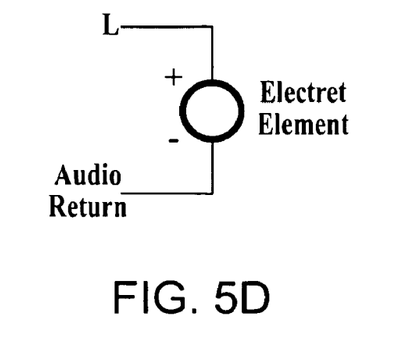
FIG. 5D is a reference schematic of an electret microphone that may be within the remote connector.

FIG. 5D is a reference schematic of an electret microphone that is within the remote connector.

For Serial Protocol Communication, two pins used to communicate to and from device (Rx (pin 19, FIG. 4A) & Tx (pin 18, FIG. 4A)). Input and output levels can be, e.g., 0V=Low, 3.3V=High.

As mentioned above, a system and method in accordance with the present invention can be utilized with a command set for allowing a portable media player to provide power to an accessory. It should be understood by one of ordinary skill in the art that although the above-identified connector interface system could be utilized with the commands, a variety of other connectors or systems could be utilized and they would be within the spirit and scope of the present invention. To describe the system and method in accordance with the present invention in more detail refer now to the accompanying description in conjunction with the accompanying figures.

Figure 6:
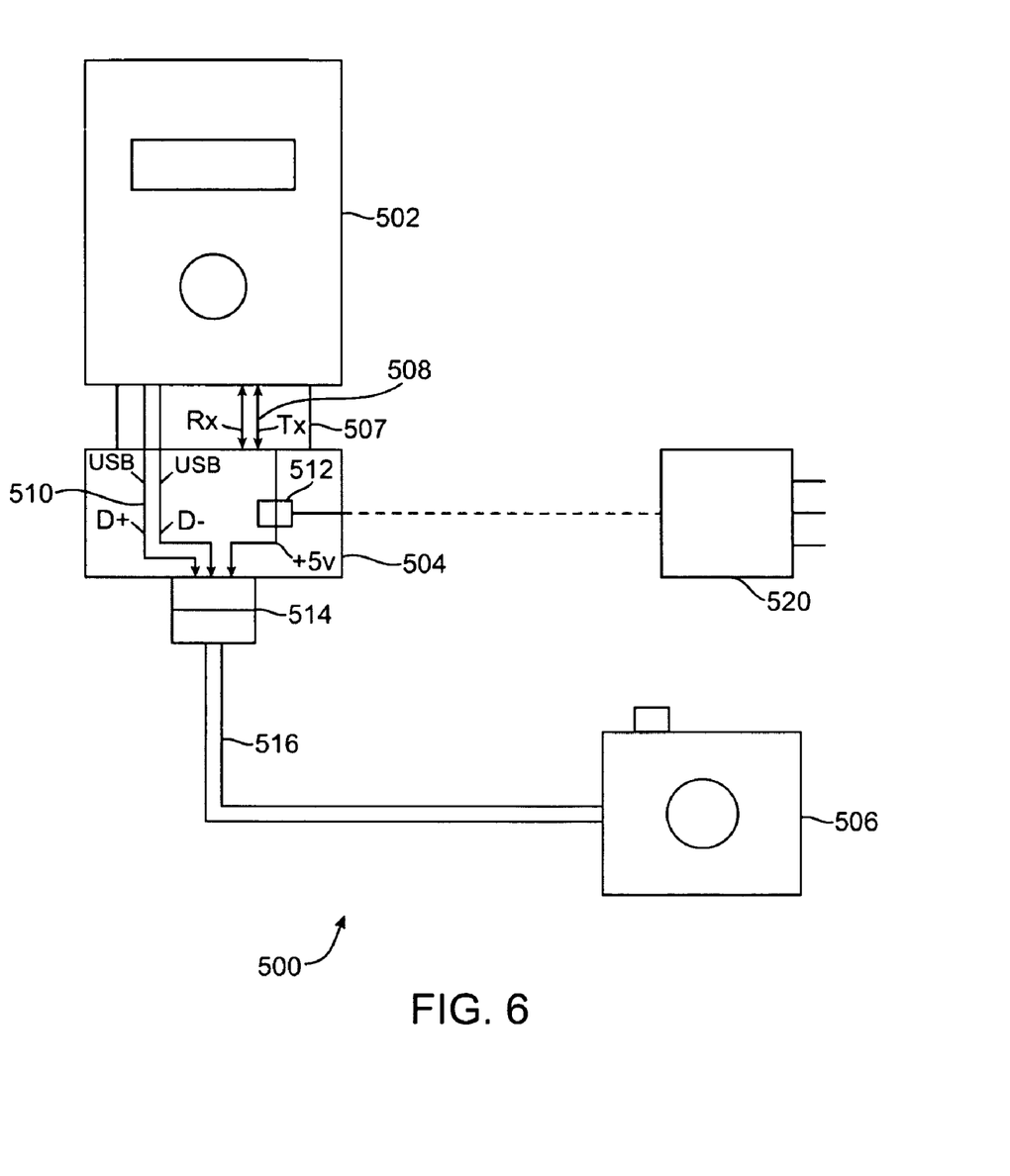
FIG. 6 illustrates an embodiment of a portable media player coupled to a dongle to provide power to an accessory.

FIG. 6 illustrates an embodiment of a portable media player 502 coupled to a dongle 504 to provide power to an accessory 506 (e.g., a camera). In this embodiment, the system 500 comprises portable media player 502 coupled to a dongle 504 via a connector 507. The connector 507, for example, could be the docking connector whose pinout shown in FIG. 4A. The connector 507 includes the serial pins 508 (Rx and Tx) which couple the portable media player to the dongle 504 and allow for communications thereto. The connector 507 also includes USB pins 510 (D+ and D−).

Accordingly, commands can be utilized across the serial bus 508 of FIG. 4A, for example, to provide power from the portable media player 502 to the accessory 506 over the 5 volt power supply line 512. Alternatively, the dongle 504 could include a power plug 520 to provide the power through the 5 volt power line 512. Therefore, the dongle 504 could either draw power from the portable media player 502 or draw power from a source using the plug 520. A connector 514 couples the dongle 504 to the accessory 506. Typically, the connector 514 comprises a USB connector. However, one of ordinary skill in the art readily recognizes that a variety of connectors could be utilized and their use would be within the spirit and scope of the present invention. Similarly, although a camera is shown as the accessory in FIG. 6, one of ordinary skill in the art ready recognizes a variety of accessories could be utilized and that would be within the spirit and scope of the present invention.

Figure 7:
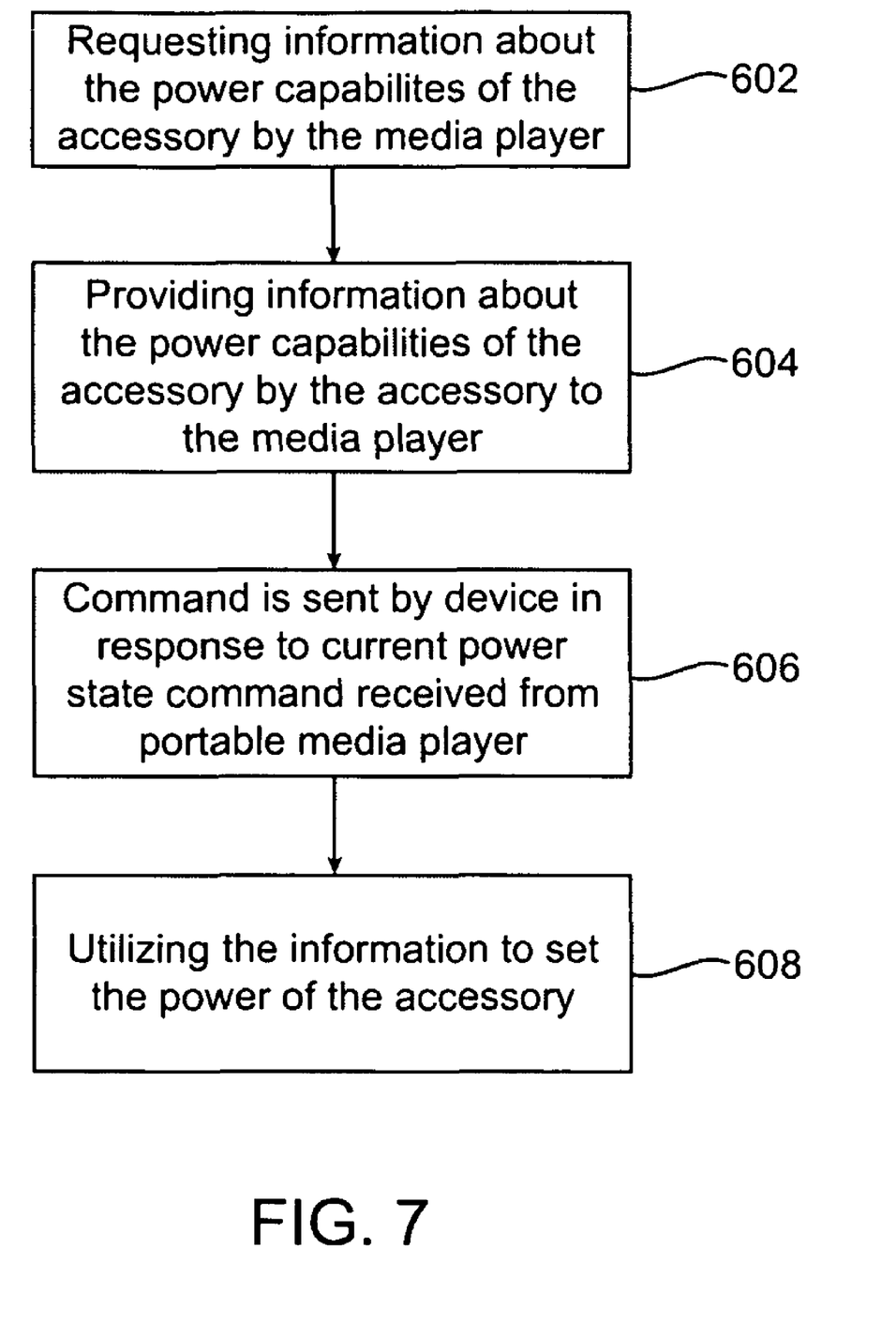
FIG. 7 is a flow chart that illustrates a method for controlling the bus power of a portable media player.

FIG. 7 is a flow chart of a method for controlling power to the accessory in accordance with the present invention. First, information is requested about the power capabilities of the accessory by the portable media player, for example, utilizing serial bus 508 of FIG. 6, via step 602. In the embodiment, a command is sent by the portable media player to obtain the current power state from the accessory.

Next, information is provided about the power capabilities of the accessory by the accessory to the portable media player, via step 604. In the embodiment, a command is sent by the device in response to the current power state command received from the portable media player, via step 606. The command returns the current state of the power supply.

Then, the information is utilized to set the power of the accessory, via step 608. In the embodiment, a command is sent by the portable media player to set the power setting. The accessory will set the power state and respond with a command indicating command completion status.

A method for a portable media player to control power provided to an accessory is disclosed. The method includes requesting information about the power capabilities of the accessory by the portable media player. The method further includes providing information about the power capabilities of the accessory by the accessory to the media player, and utilizing the information to set the power of the accessory. A method and system in accordance with the present invention provides a system that allows a portable media player to obtain information from an accessory concerning its power requirements. A portable media player can then utilize the power requirement information to allow for the powering of the accessory when connected to the portable media player.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention can be stored in some form of computer-readable medium, such as a memory or CD-ROM, or transmitted over a network, and is to be executed by a processor. Consequently, a computer-readable medium is intended to include a computer readable signal, which may be, for example, transmitted over a network. Also, the principles of the present invention apply to different types of portable media players having different levels of functionality and different form factors. Accordingly, many modifications may be made by one of ordinary skill in the art without departing from the spirit and scope of the appended claims.

What is claimed is:

1. A portable media player comprising:
   a storage medium to store media assets;
   a processor configured to retrieve and play stored media assets from the storage medium; and
   an interface in communication with the processor and adapted to communicate with an accessory by exchanging a plurality of commands with the accessory, the plurality of commands comprising:
   a first command for requesting a current power state of the accessory, the first command being sendable by the media player;
   a second command for communicating information about the current power state of the accessory, the second command being receivable by the media player;
   a third command for instructing the accessory to set a new power state of the accessory, the third command being sendable by the media player; and
   a fourth command for communicating acceptance of the new power setting by the accessory, the second command being receivable by the media player.

2. The portable media player of claim 1 further comprising a power source housed within the portable media player and wherein the interface is further configured to provide power from the power source to the accessory.

3. The portable media player of claim 1 wherein power is provided to the accessory from a power source external to the portable media player.

4. The portable media player of claim 1 wherein the interface includes a connector having a plurality of signal contacts, wherein at least some of the signal contacts are utilized to communicate the plurality of commands.

5. The portable media player of claim 4 wherein the connector comprises:
   a keying arrangement, wherein one set of keys are separated by one length and another set of keys are separated by another length, and
   wherein the plurality of signal contacts includes:
   a ground contact and a power contact, wherein the ground contact makes contact with a mating connection before the power contact;
   a USB signal contact;
   a USB power contact;
   an accessory identify signal contact;
   a video contact;
   an accessory power contact;
   an accessory protocol contact; and
   an accessory detect signal contact,
   wherein at least one of the contacts is active when an accessory is coupled to the connector.

6. A computer readable medium encoded with program instructions which when executed by a portable media player cause the portable media player to execute a method for controlling power settings of an accessory, the method comprising:
   sending a first command to the accessory to request information about a current power state of the accessory;
   receiving a second command from the accessory, the second command including the requested information about the current power state of the accessory; and
   sending a third command to the accessory, the third command instructing the accessory to set a new power state.

7. The computer readable medium of claim 6 wherein the commands are sent and received using serial communication pins of a connector of the portable media player.

8. The computer readable medium of claim 6 wherein the method further comprises:
   sending a fourth command to the accessory, the fourth command requesting information indicating power capabilities of the accessory; and
   receiving a fifth command from the accessory, the fifth command providing the requested information indicating the power capabilities of the accessory.

9. A method for operating a media player coupled to an accessory, the method comprising, by the media player:
   sending to the accessory a request for information indicating power capabilities of the accessory;
   receiving the requested information from the accessory;
   determining a new power state for the accessory based at least in part on the received information; and
   sending a power setting command to the accessory, the power setting command instructing the accessory to set a power state of the accessory to the new power state.

10. The method of claim 9 further comprising:
    receiving an acknowledgement command from the accessory, the acknowledgement command indicating acceptance of the new power state by the accessory.

11. The method of claim 9 further comprising, by the media player:
   sending to the accessory a power state command, the power state command instructing the accessory to indicate the current power state; and
   in response to the power state command, receiving information from the accessory indicating the current power state.

12. The method of claim 11 wherein the new power state for the accessory is determined based in part on the current power state.

13. The method of claim 11 wherein the information indicating the power capabilities of the accessory includes information identifying a plurality of power states supported by the accessory.

14. The method of claim 13 wherein the plurality of power states supported by the accessory includes:
   a high power state associated with active usage of the accessory; and
   a low power state associated with inactivity of the accessory.

15. The method of claim 9 further comprising providing power to the accessory from a power supply located within the media player.

16. The method of claim 9 wherein the accessory receives power from a power supply external to the media player.

17. A portable media player comprising:
   an interface adapted to be coupled with an accessory and configured to support an accessory protocol for exchanging with the accessory commands and information related to power management; and
   a control module coupled to the interface, the control module being configured to:
   send to the accessory via the interface a request for information indicating power capabilities of the accessory;
   receive the requested information from the accessory via the interface; and
   send a power setting command to the accessory via the interface, the power setting command instructing the accessory to set a power state of the accessory to a new power state determined by the media player, wherein the accessory sets the power state of the accessory to the new power state in response to the power setting command.

18. The portable media player of claim 17 wherein the control module is further configured to send to the accessory a power state command, the power state command instructing the accessory to provide the current power state, and in response to the power state command, to receive from the accessory information indicating the current power state.

19. The portable media player of claim 18 wherein the accessory is configured to support a plurality of power states, the plurality of power states including:
   a high power state associated with active usage of the accessory; and
   a low power state associated with inactivity of the accessory.

20. The portable media player of claim 17 wherein the interface includes a power pin adapted to provide power to the accessory.

21. The portable media player of claim 17 wherein the interface includes a plurality of pins compatible with a USB interface.

22. The portable media player of claim 21 wherein the plurality of pins compatible with the USB interface includes at least two signal pins.

23. The portable media player of claim 17 further comprising:
   a dongle having a first end adapted to connect to the interface and a second end adapted to connect to an accessory,
   the dongle comprising a plurality of signal paths adapted to pass electrical signals between the interface and the accessory.

24. The portable media player of claim 23 wherein the dongle further comprises a power supply adapted to deliver power to the accessory.

* * * * *